(12) United States Patent
Kito (10) Patent No.: US 8,081,616 B2
(45) Date of Patent: Dec. 20, 2011

(54) COMMUNICATION APPARATUS AND COMMUNICATION METHOD

(75) Inventor: Toshiyuki Kito, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/967,875

(22) Filed: Dec. 14, 2010

(65) Prior Publication Data

US 2011/0142021 A1    Jun. 16, 2011

(30) Foreign Application Priority Data

Dec. 16, 2009  (JP) ................................. 2009-285426

(51) Int. Cl.
*H04W 4/00* (2009.01)
*G06F 15/177* (2006.01)

(52) U.S. Cl. ....................................... 370/338; 709/222
(58) Field of Classification Search .................. 370/338; 709/222

See application file for complete search history.

(56) References Cited

U.S. PATENT DOCUMENTS

| | | | |
|---|---|---|---|
| 6,895,515 B1 * | 5/2005 | Yamazaki ...................... 713/300 |
| 2001/0004778 A1 * | 6/2001 | Heimbrock et al. .............. 5/622 |
| 2004/0132502 A1 | 7/2004 | Matsumura |
| 2005/0048951 A1 * | 3/2005 | Saito .............................. 455/411 |
| 2005/0251855 A1 * | 11/2005 | Brandstatter .................... 726/12 |
| 2006/0067357 A1 * | 3/2006 | Rader ............................. 370/463 |
| 2008/0028053 A1 * | 1/2008 | Kelley et al. .................... 709/222 |
| 2008/0059641 A1 * | 3/2008 | Hernandez et al. ............. 709/229 |
| 2008/0104424 A1 * | 5/2008 | Jennings ........................ 713/300 |
| 2008/0229091 A1 * | 9/2008 | Abu-Akel ......................... 713/2 |
| 2008/0240068 A1 | 10/2008 | Ishimoto |
| 2008/0313481 A1 * | 12/2008 | Paljug ............................ 713/323 |
| 2009/0063878 A1 * | 3/2009 | Schmidt et al. ................ 713/310 |
| 2010/0106951 A1 * | 4/2010 | Lu et al. ............................. 713/1 |
| 2011/0080349 A1 * | 4/2011 | Holbein et al. ................ 345/173 |
| 2011/0230139 A1 | 9/2011 | Nakahara |

FOREIGN PATENT DOCUMENTS

| | | |
|---|---|---|
| JP | 2004-206580 A | 7/2004 |
| JP | 2006-339795 A | 12/2006 |
| JP | 2008-252787 A | 10/2008 |
| JP | 2008-283422 A | 11/2008 |

OTHER PUBLICATIONS

Kazawa et al.,"Network Technologies for VARDIA™ High-Definition Recorder," Special Reports, Toshiba Review vol. 64, No. 12, 2009.

* cited by examiner

*Primary Examiner* — Kenny Lin
(74) *Attorney, Agent, or Firm* — Knobbe, Martens, Olson & Bear, LLP (57) ABSTRACT

According to one embodiment, a communication apparatus has a transmission/reception module, a WLAN-setting data storage module, a registrar process module, a WOL-setting data storage module, and a WOL-setting data addition module. The transmission/reception module transmits and receives data to and from an external apparatus through wireless communication. The WLAN-setting data storage module stores WLAN-setting data for setting a WLAN function. The registrar process module transmits and receives data to and from the external apparatus via the transmission/reception module on the basis of the data stored in the WLAN-setting data storage module, and registers the external apparatus as an enrollee. The WOL-setting data storage module stores WOL-setting data for setting WOL function with respect to the external apparatus. The WOL-setting data addition module adds the WOL-setting data stored in the WOL-setting data storage module, to the data to be transmitted by the registrar process module to the external apparatus.

5 Claims, 6 Drawing Sheets

| Type | Length | Value |
|---|---|---|
| Network Index | 1 | 1 |
| SSID | 9 | Network-1 |
| Authentication Type | 2 | 0x0020 |
| Encryption Type | 2 | 0x0008 |
| Network Key | 8 | 12345678 |
| MAC Address | 6 | 0123456789ab |
| Vendor Extension | 10 | Extension Data |

| Extension Type | Extension length | Extension Value |
|---|---|---|
| WOL set up | 6 | 001122334455 |

COMMUNICATION APPARATUS AND COMMUNICATION METHOD

CROSS-REFERENCE TO RELATED APPLICATIONS

This application is based upon and claims the benefit of priority from Japanese Patent Application No. 2009-285426, filed Dec. 16, 2009; the entire contents of which are incorporated herein by reference.

FIELD

Embodiments described herein relate generally to a communication apparatus and a communication method, both designed to transmit and receive control signals and data between a plurality of apparatuses.

BACKGROUND

In recent years, the storage capacities of various data recording media have increased. Further, broadcast data receiving apparatuses, video recorders (data record/playback apparatuses), and the like are put to practical use in increasing numbers. The broadcast data receiving apparatus and the data record/playback apparatus record compressed data such as video contents (programs) or music contents (programs) in a recording medium. Most broadcast data receiving apparatuses and most data record/playback apparatuses use, as recording medium, a magnetic disk such as hard disk drive (HDD), a semiconductor memory device such as solid state drive (SSD), or an optical disk such as digital versatile disk (DVD).

Further, the communication network technology has advanced in recent years, and LANs have been provided in offices and houses in increasing numbers. Various guidelines are available, including digital living network alliance (DLNA). If a LAN connects apparatuses compatible with DLNA to one another, these apparatuses can share contents.

Moreover, the wireless communication technology has advanced in recent years, and more and more wireless LANs (WLANs) have come into use. If a WLAN connects apparatuses compatible with DLNA to one another, these apparatuses can acquire contents from one another.

To connect apparatuses by using a WLAN, an enrollee (slave apparatus) must input authentication data to a registrar (master apparatus), thereby to achieve connection setting. To accomplish the connection setting easily, a communication apparatus has been provided. This communication apparatus transmits authentication data from the enrollee to the registrar (see, for example, Jpn. Pat. Appln. KOKAI Publication No. 2008-283422, which is a Japanese patent document).

To activate the DLNA function that enables the mutually connected apparatuses to share the contents, however, it is necessary to turn on both the power supply of the apparatus (client) that plays back any content and the power supply of the apparatus (server) that supplies the content. These apparatuses may be located remote from each other and may be connected to each other by the WLAN. In this case, the user who operates the client needs to turn on the power supply of the server. This is troublesome for the user.

This problem can be solved by the wake-on-LAN (WOL) function that controls the power supply of a remote apparatus through a LAN. If a LAN connects the client and the server that are compatible with the WOL function and the connection setting is duly achieved, the client apparatus can turn on the power supply of the server apparatus. However, the user must input the authentication data to achieve the WOL setting. This is troublesome, too, for the user.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings. In general, according to one embodiment, a communication apparatus has a transmission/reception module, a WLAN-setting data storage module, a registrar process module, a WOL-setting data storage module, and a WOL-setting data addition module. The transmission/reception module transmits and receives data to and from an external apparatus through wireless communication. The WLAN-setting data storage module stores WLAN-setting data for setting a WLAN function. The registrar process module transmits and receives data to and from the external apparatus via the transmission/reception module on the basis of the data stored in the WLAN-setting data storage module, and registers the external apparatus as an enrollee. The WOL-setting data storage module stores WOL-setting data for setting WOL function with respect to the external apparatus. The WOL-setting data addition module adds the WOL-setting data stored in the WOL-setting data storage module, to the data to be transmitted by the registrar process module to the external apparatus.

With reference to the accompanying drawings, a communication apparatus and a communication method, both according to one embodiment, will be described in detail, based on the assumption that the communication apparatus is implemented by a broadcast data receiving apparatus and a data record/playback apparatus.

Figure 1:
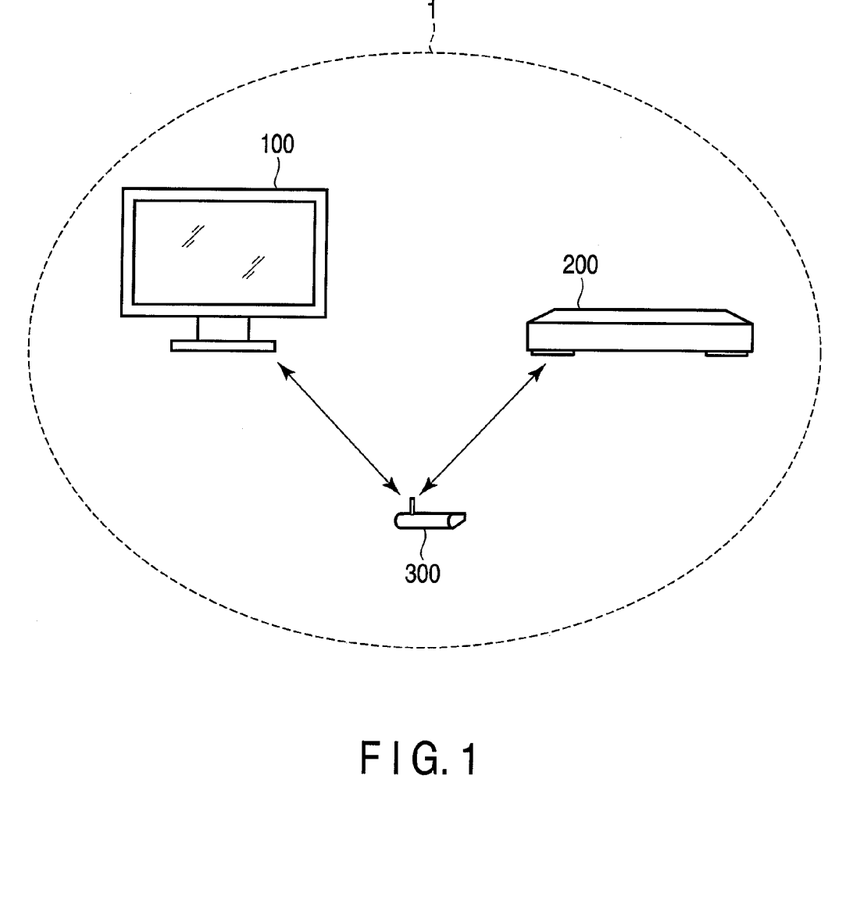
FIG. 1 is an exemplary view for explaining the configuration of a communication system according to an embodiment.

FIG. 1 is a view for explaining the configuration of a communication system according to an embodiment.

As shown in FIG. 1, the communication system 1 comprises a broadcast data receiving apparatus 100, a data record/playback apparatus 200, and an access point 300. Assume that the broadcast data receiving apparatus 100 and data record/playback apparatus 200 have DLNA function, WLAN function and WOL function each. That is, a wireless LAN can connect the broadcast data receiving apparatus 100 and data record/playback apparatus 200 via the access point 300.

More precisely, if the broadcast data receiving apparatus 100 and the data record/playback apparatus 200 exist in the communication area the access point 300 covers, they can authenticate each other by means of wireless communication, to establish a wireless communication path, if both apparatuses 100 and 200 lie in the communication area the access point 300 covers.

Figure 2:
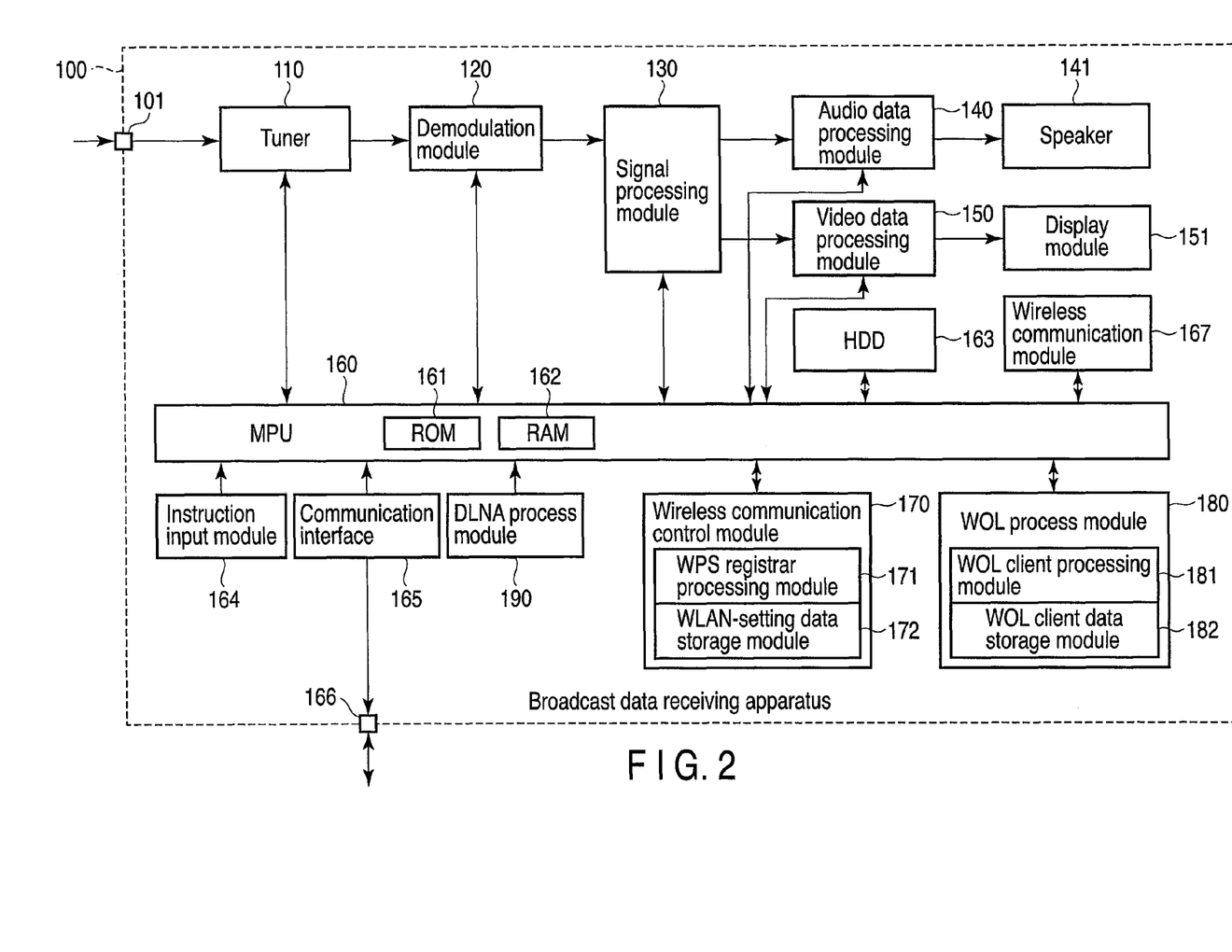
FIG. 2 is an exemplary view for explaining the configuration of a broadcast data receiving apparatus according to an embodiment.

FIG. 2 is a block diagram for explaining the broadcast data receiving apparatus 100 shown in FIG. 1.

The broadcast data receiving apparatus 100 comprises a tuner 110, a demodulation module 120, a signal processing module 130, an audio data processing module 140, a speaker 141, a video data processing module 150, a display module 151, and an MPU 160. The MPU 160 has a ROM 161 and a RAM 162. The broadcast data receiving apparatus 100 further comprises an input terminal 101, an HDD 163, an instruction input module 164, a communication interface 165, a communication terminal 166, a wireless communication module 167, a wireless communication control module 170, a WOL process module 180, and a DLNA process module 190.

The input terminal 101 receives, for example, a digital broadcast signal, which is supplied to the tuner 110. The tuner 110 is a tuner configured for processing digital broadcast signals. The tuner 110 performs tuning on the digital broadcast signal supplied from the input terminal 101. The digital broadcast signal, thus turned, is transmitted to the demodulation module 120. The demodulation module 120 demodulates the digital broadcast signal it has received. The digital broadcast signal, thus demodulated, is input to the signal processing module 130.

The signal processing module 130 functions as a signal processing module for processing signals. The signal processing module 130 processes any digital broadcast signal it has received from the demodulation module 120. More precisely, the signal processing module 130 splits the digital broadcast signal into a video signal and an audio signal. The signal processing module 130 supplies the audio signal to the audio data processing module 140, and the video signal to the video data processing module 150.

The audio data processing module 140 receives the audio signal from the signal processing module 130 and converts the signal to an audio signal having such a format that a speaker 141 may generate sound from it. The audio signal of this format is output to the speaker 141. The speaker 141 generates sound from the audio signal.

Meanwhile, the video data processing module 150 decodes the digital video signal received from the signal processing module 130. Controlled by the MPU 160, the video data processing module 150 generates an OSD signal for displaying a graphical user interface (GUI) menu. The video data processing module 150 further superimposes the OSD signal on the video signal received from decoded, thereby generating a synthesized signal.

The video data processing module 150 converts the video data processing module 150 to a video signal of such a format that the display module 151 may display the image the video signal represents. The video signal is output to the display module 151. The display module 151 is constituted by, for example, a liquid crystal display. The display module 151 displays the image represented by the video signal it has received.

The MPU 160 controls the other components of the broadcast data receiving apparatus 100. The MPU 160 comprises an operation element such as a CPU. The MPU 160 performs various processes in accordance with operating signals supplied from the instruction input module 164.

The ROM 161 stores the system control program designed for the broadcast data receiving apparatus 100, and also various process programs. The RAM 162 functions as work memory for the CPU. That is, the MPU 160 activates the programs stored in the ROM 161 in accordance with an operation signal supplied from the instruction input module 164, thereby controlling the other components of the broadcast data receiving apparatus 100.

The HDD 163 is a data recording medium that can record contents. The HDD 163 stores content data items such as video data, audio data or broadcast programs. Further, the HDD 163 outputs the contents it stores, in response to a request made by the MPU 160. The MPU 160 can perform signal processing on any content read from the HDD 163 and can output the content processed, to the speaker 141 and HDD 163.

The instruction input module 164 functions to input operating signals. The instruction input module 164 is constituted by operation keys or a light receiving module configured to receive the operating signals transmitted from a remote controller. The instruction input module 164 generates operating signals as it is operated by the user. The operating signals, thus generated, are supplied to the MPU 160.

The communication interface 165 is a communication module configured to connect the broadcast data receiving apparatus 100 to the external apparatus or a network. The communication interface 165 performs data transfer between the MPU 160 and the apparatus connected to the communication terminal 166. The communication terminal 166 is constituted by a LAN terminal or a USB terminal.

The wireless communication module 167 is a module configured to achieve wireless communication with the access point 300. That is, the wireless communication module 167 is a transmission/reception module configured to transmit and receive data to and from the external apparatus. The wireless communication module 167 comprises, for example, an antenna and a data processing module. The antenna receives radio waves. The data processing module recognizes the data received by the antenna and transmits the data to the MPU 160.

The wireless communication control module 170 controls the wireless communication module 167, which performs wireless communication. The wireless communication control module 170 comprises a WPS registrar processing module 171 and a WLAN-setting data storage module 172.

The WPS registrar processing module 171 is a module configured to perform a Wi-Fi (trademark) protected setup (WPS) process. The WPS process is a process defined by Wi-Fi Alliance. The WPS process is a method of setting wireless LANs with ease. Assume that in this embodiment, the broadcast data receiving apparatus 100 functions as registrar that registers enrollees, and the data record/playback apparatus 200 function as an enrollee that may be registered by the registrar.

The WPS registrar processing module 171 registers enrollees in a push-button scheme. That is, the WPS registrar processing module 171 functions as registrar processing module configured to register the external apparatus as an enrollee.

If the user operates the instruction input module 164, the WPS registrar processing module 171 causes the display module 151 to display a button. The user may select the button thus displayed. In this case, the broadcast data receiving apparatus 100 makes the access point 300 transmits a beacon for a prescribed time in the communication area the access point 300 covers. Note that a push button that performs the same function as the button displayed may be provided on the broadcast data receiving apparatus 100.

If the push button is pushed at the enrollee while the access point 300 is transmitting a beacon, the enrollee will transmits a probe to the broadcast data receiving apparatus 100 functioning as registrar. On receiving the probe, the broadcast data receiving apparatus 100 recognizes that an enrollee that can communicate with it exists in the communication area the access point 300 covers. Thus, the broadcast data receiving apparatus 100 detects, for example, the data record/playback apparatus 200, as an enrollee. In this case, the broadcast data receiving apparatus 100 functions as registrar, authenticating the data record/playback apparatus 200 as enrollee and initiates wireless communication with the data record/playback apparatus 200 via the access point 300.

The WLAN-setting data storage module 172 is a module storing various data items for use in setting the authentication process and wireless communication, with respect to the enrollee. More precisely, the WLAN-setting data storage module 172 stores, for example, the network index, service set identity (SSID), authentication data, network key and MAC address of the broadcast data receiving apparatus 100. Further, the WLAN-setting data storage module 172 stores data and authentication data that identify the enrollees that exist in the network.

The WOL process module 180 controls the wake-on-LAN (WOL) process performed on the apparatuses connected by a LAN. The WOL process module 180 comprises a WOL client processing module 181 and a WOL client data storage module 182.

The WOL client processing module 181 controls any process concerning WOL. The WOL client data storage module 182 is a setting data storage module that stores the WOL setting data that is used to set WOL. The WOL setting data is, for example, authentication data such as an MAC address. The present embodiment will be explained, on the assumption that the broadcast data receiving apparatus 100 and the data record/playback apparatus 200 are a client and a server, respectively, in the WOL process.

The broadcast data receiving apparatus 100, i.e., client, registers the authentication data stored in the WOL client data storage module 182 in the data record/playback apparatus 200, i.e., server. The broadcast data receiving apparatus 100 can therefore control the data record/playback apparatus 200 to make the same perform a WOL-supported process.

In order to activate the data record/playback apparatus 200, the broadcast data receiving apparatus 100 transmits an activation control signal and authentication data, which is stored in the WOL client data storage module 182, to the data record/playback apparatus 200. If the authentication data is registered data, the data record/playback apparatus 200 will perform its function in accordance with the control signal it has received.

The DLNA process module 190 controls any process concerning the DLNA function. That is, the DLNA process module 190 controls the transfer of contents between the broadcast data receiving apparatus 100 and the data record/playback apparatus 200 connected to the apparatus 100 by a network such as a LAN. This embodiment will be explained, on the assumption that the broadcast data receiving apparatus 100 is the client that plays back any content and the data record/playback apparatus 200 is the server that records and provides contents.

The DLNA process module 190 of the broadcast data receiving apparatus 100, which functions s client, acquires a list of contents from the data record/playback apparatus 200 functioning as server. The DLNA process module 190 causes the display module 151 to display the list of contents. If an operating signal is input at the instruction input module 164, instructing that a content should be read from the server, the DLNA process module 190 will read this content from the server and process the content in order to playback the same.

Figure 3:
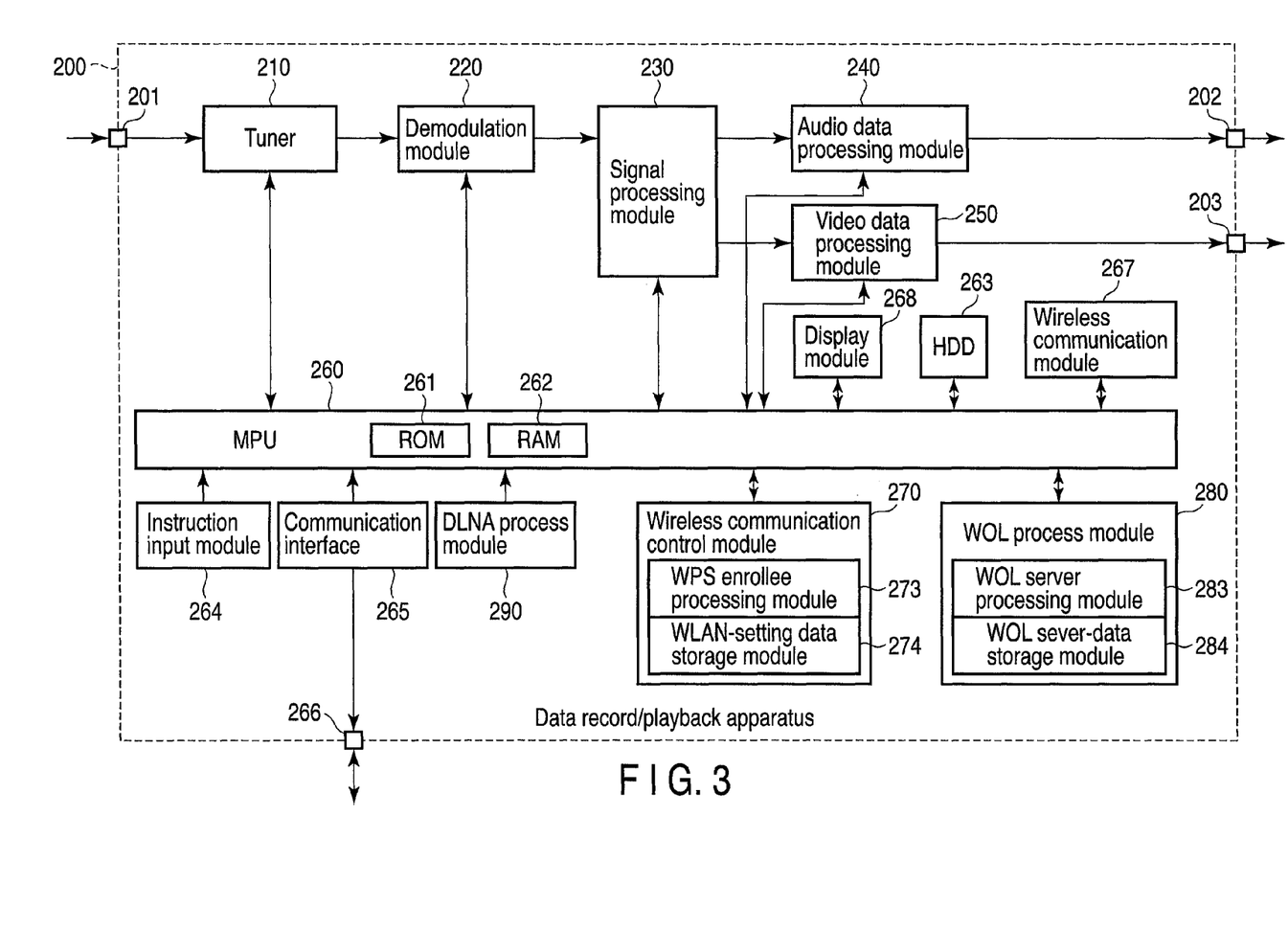
FIG. 3 is an exemplary view for explaining the configuration of a data record/playback apparatus according to the embodiment.

FIG. 3 is a block diagram for explaining an exemplary configuration of the data record/playback apparatus 200 shown in FIG. 1.

The data record/playback apparatus 200 comprises a tuner 210, a demodulation module 220, a signal processing module 230, an audio data processing module 240, a video data processing module 250, and an MPU 260. The MPU 260 has a ROM 261 and a RAM 262. Further, the record/playback apparatus 200 comprises an input terminal 201, an audio data output terminal 202, a video data output terminal 203, an HDD 263, an instruction input module 264, a communication interface 265, a communication terminal 266, a wireless communication module 267, a display module 268, a wireless communication control module 270, a WOL process module 280, and an DLNA process module 290.

The input terminal 201, tuner 210, demodulation module 220, signal processing module 230, audio data processing module 240 and video data processing module 250 are identical in configuration, respectively to the input terminal 101, tuner 110, demodulation module 120, signal processing module 130, audio data processing module 140 and video data processing module 150 of the broadcast data receiving apparatus 100. Therefore, they will not be described in detail.

The record/playback apparatus 200 does not comprise a speaker configured to play back audio signals or a display module configured to play back video signals. This is why the record/playback apparatus 200 has the audio data output terminal 202 and the video data output terminal 203.

The audio data processing module 240 receives an audio signal from the signal processing module 230 and converts the signal to an audio signal having such a format that a speaker 141 may generate sound from it. The audio signal of this format is output via the audio data output terminal 202. The video data processing module 250 outputs a video signal or performs an OSD process, synthesizing a signal containing character data. Either signal is output via the video data output terminal 203.

The MPU 260 controls the other components of the record/playback apparatus 200. The MPU 260 comprises an operation element such as a CPU. The MPU 260 performs various processes in accordance with operating signals supplied from the instruction input module 264.

The ROM 261 stores the system control program designed for the record/playback apparatus 200, and also various process programs. The RAM 262 functions as work memory for the CPU. That is, the MPU 260 activates the programs stored in the ROM 261 in accordance with an operation signal supplied from the instruction input module 264, thereby controlling the other components of the broadcast data receiving apparatus 100.

The HDD 263 is a data recording medium that can record contents. The HDD 263 stores content data items such as video data, audio data or broadcast programs. Further, the HDD 263 outputs the contents it stores, in response to a request made by the MPU 260. The MPU 260 can perform signal processing on the contents read from the HDD 263 and can output the contents processed via the audio data output terminal 202 and video data output terminal 203.

The instruction input module 264 functions to input operating signals. The instruction input module 264 is constituted by operation keys or a light receiving module configured to receive the operating signals transmitted from a remote controller. The instruction input module 264 generates operating signals as it is operated by the user. The operating signals, thus generated, are supplied to the MPU 260.

The communication interface 265 is a communication module configured to connect the record/playback apparatus 200 to the external apparatus or a network. The communication interface 265 performs data transfer between the MPU 260 and the apparatus connected to the communication terminal 266. The communication terminal 266 is constituted by a LAN terminal or a USB terminal.

The wireless communication module 267 is a module configured to achieve wireless communication with the access point 300. That is, the wireless communication module 267 is a transmission/reception module configured to transmit and receive data to and from the external apparatus. The wireless communication module 267 comprises, for example, an antenna and a data processing module. The antenna receives radio waves. The data processing module recognizes the data received by the antenna and transmits the data to the MPU 260.

The display module 268 is a display module configured to display the status of the record/playback apparatus 200, the presence or absence of any operation undergoing or LAN connection, and the storage capacity of the HDD 263.

The wireless communication control module 270 controls the wireless communication module 267, which performs wireless communication. The wireless communication control module 270 comprises a WPS enrollee processing module 273 and a WLAN-setting data storage module 272.

The WPS enrollee processing module 273 is a module that performs a WPS process. As described above, it is assumed that in this embodiment, the broadcast data receiving apparatus 100 functions as registrar that registers enrollees, and the data record/playback apparatus 200 function as an enrollee that may be registered by the registrar.

The WPS enrollee processing module 273 registers enrollees in a push-button scheme. That is, the WPS enrollee processing module 273 functions as an enrollee processing module configured to register the external apparatus as an enrollee. If the user operates the instruction input module 264, the WPS enrollee processing module 273 causes the display module 268 to display a button. The user may select the button thus displayed. In this case, the WPS enrollee processing module 273 starts waiting for a beacon transmitted via the access point 300. Note that a push button that performs the same function as the button displayed may be provided on the data record/playback apparatus 200.

If the data record/playback apparatus 200 receives a beacon, it will transmit a probe via the access point 300 to the broadcast data receiving apparatus 100 functioning as registrar. Thereafter, the data record/playback apparatus 200 performs an authentication process and wireless communication with the data record/playback apparatus 200.

The WLAN-setting data storage module 272 is a module storing various data items for use in setting the authentication process and wireless communication, with respect to the enrollee. The WLAN-setting data storage module 272 stores, for example, the network index, service set identity (SSID), authentication data, network key and MAC address of the data record/playback apparatus 200.

The WOL process module 280 controls the wake-on-LAN (WOL) process performed on the apparatuses connected by a LAN. The WOL process module 280 comprises a WOL server processing module 283 and a WOL server-data storage module 284.

The WOL server processing module 283 controls any process concerning WOL. The WOL sever-data storage module 284 is a storage module that stores the authentication data used to set WOL. The WOL sever-data storage module 284 further stores the authentication data transmitted from the client. As described above, the broadcast data receiving apparatus 100 and the data record/playback apparatus 200 are a client and a server, respectively, in the present embodiment.

The data record/playback apparatus 200, i.e., server, registers the authentication data received from the broadcast data receiving apparatus 100, i.e., client, in the WOL sever-data storage module 284. That is, the WOL sever-data storage module 284 functions as a WOL setting data storage module configured to store the authentication data received from the broadcast data receiving apparatus 100.

To receive a control signal via the LAN, the data record/playback apparatus 200 confirms the authentication data added to the control signal. If the authentication data is registered in the WOL sever-data storage module 284, the data record/playback apparatus 200 will perform its function in accordance with the control signal it has received.

The DLNA process module 290 performs a control in connection with the DLNA function. That is, the DLNA process module 290 controls the transfer of contents between the data record/playback apparatus 200 and the broadcast data receiving apparatus 100 connected to the apparatus 200 to the apparatus 100 by a network such as a LAN. As indicated above, the broadcast data receiving apparatus 100 is a client that plays back contents, and the data record/playback apparatus 200 is a server that provides the contents, in the present embodiment.

The DLNA process module 190 of the broadcast data receiving apparatus 100, i.e., client, requests for a content list, which the data record/playback apparatus 200 may transmits to the apparatus 100. On receiving the request, the DLNA process module 290 generates a content list on the basis of the contents stored in the HDD 263. The content list, thus generated, is transmitted to the broadcast data receiving apparatus 100. The data record/playback apparatus 200 may receive a request for playing back a specific content, from the broadcast data receiving apparatus 100. In this case, the DLNA process module 290 reads the content from the HDD 263 and transmits the content to the broadcast data receiving apparatus 100.

Figure 4:
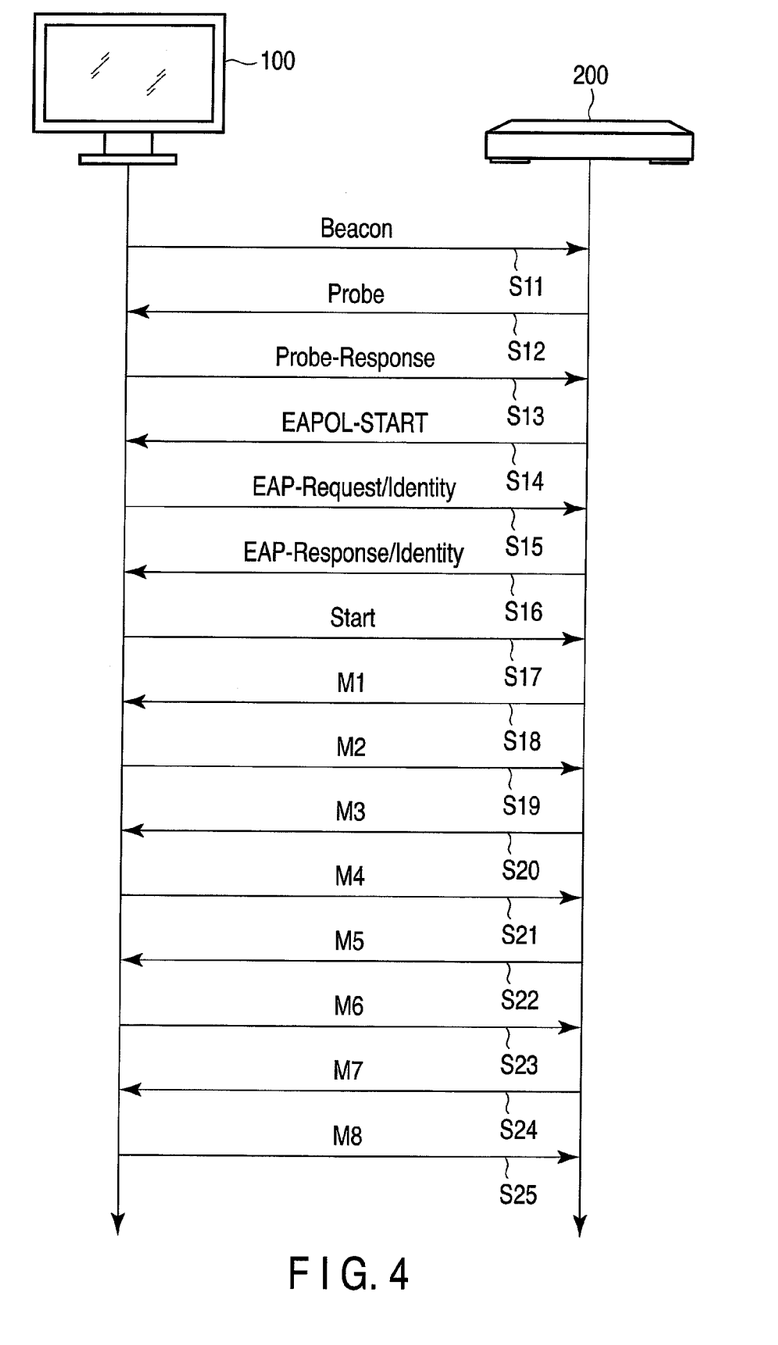
FIG. 4 is an exemplary view for explaining the WPS process performed on the data transferred between broadcast data receiving apparatus and the data record/playback apparatus, both according to the embodiment.

FIG. 4 shows the sequence of the WPS process performed between the broadcast data receiving apparatus 100 and the data record/playback apparatus 200, both shown in FIG. 1.

Assume that the push button is pushed at the broadcast data receiving apparatus 100 and data record/playback apparatus 200. Then, the WPS process is performed in both apparatuses 100 and 200. First, the broadcast data receiving apparatus 100 and data record/playback apparatus 200 establish mutual communication.

The broadcast data receiving apparatus 100, which functions as registrar, transmits a beacon signal for a prescribed time in the communication area the access point 300 covers (Step S11).

The data record/playback apparatus 200, which has a wireless communication function, receives the beacon transmitted from the broadcast data receiving apparatus 100. The data record/playback apparatus 200 then transmits a probe signal (probe request signal) in the communication area the access point 300 covers (Step S12).

On receiving the probe, the broadcast data receiving apparatus 100 confirms that an apparatus (i.e., data record/playback apparatus 200) that can be registered as an enrollee exists in the communication area the access point 300 covers.

Then, the broadcast data receiving apparatus 100 transmits a probe-response signal to the data record/playback apparatus 200, establishing communication with the data record/playback apparatus 200 (Step S12).

Next, the broadcast data receiving apparatus 100 and the data record/playback apparatus 200 perform an authentication process.

More precisely, the broadcast data receiving apparatus 100 and the data record/playback apparatus 200 exchange EAPOL-START, EAP-Request/Identity, and EAP-Response/Identity, which are authentication packets, thereby accomplishing an authentication process by using the extensive authentication protocol (EAP) (Steps S14 to S16).

That is, the data record/playback apparatus 200 transmits EAPOL-START to the broadcast data receiving apparatus 100, requesting that the authentication should be started (Step S14). Then, the broadcast data receiving apparatus 100 transmits EAP-Response/Identity to the data record/playback apparatus 200, requesting for the identifier of the data record/playback apparatus 200 (Step S15). The data record/playback apparatus 200 transmits EAP-Response/Identity containing its identifier, to the broadcast data receiving apparatus 100 (Step S16).

Further, the broadcast data receiving apparatus 100 and the data record/playback apparatus 200 exchange messages M1 to M8 (Steps S17 to S25). The messages M1 to M8 contain WLAN-setting data necessary for achieving WLAN communication. In the broadcast data receiving apparatus 100, the WLAN setting data received is stored in the WLAN-setting data storage module 172. In the data record/playback apparatus 200, the WLAN setting data received is stored in the WLAN-setting data storage module 272.

Now that the WPS process has been performed, the broadcast data receiving apparatus 100 and the data record/playback apparatus 200 can perform wireless communication with each other through the access point 300. That is, if the push button is found to have been pushed, the broadcast data receiving apparatus 100 and the data record/playback apparatus 200 perform the WPS process, whereby they are connected by the WLAN to each other in the communication system 1.

Figure 5:
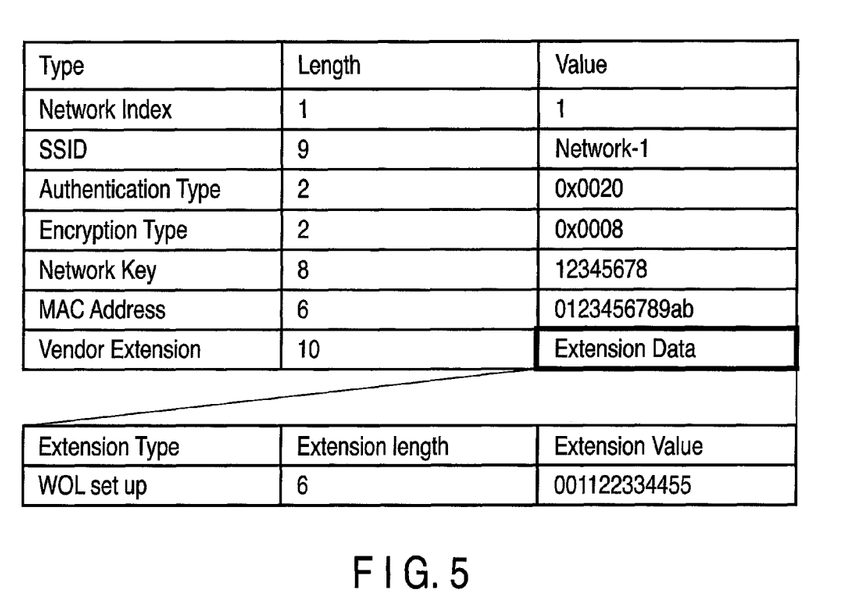
FIG. 5 is an exemplary view for explaining messages that are transmitted in the WPS process according to the embodiment.

FIG. 5 is a view explaining an exemplary view for explaining the messages M8 transmitted in the WPS process shown in FIG. 4. The WPS registrar processing module 171 of the broadcast data receiving apparatus 100 transmits the message M8 shown in FIG. 5 to the data record/playback apparatus 200.

As seen from FIG. 5, the message M8 contains various data items such as "Network Index," "SSID," "Authentication Type," "Encryption Type," "Network Key," "MAC Address" and "Vendor Extension." Each of these data items is composed of Type, Length and Value.

"Network Index" is an index assigned to the network constituted by the broadcast data receiving apparatus 100 that is a registrar. "SSID" is data representing the name of the network.

"Authentication Type" is data representing the type of the authentication process performed in the network constituted by the broadcast data receiving apparatus 100 that is a registrar.

"Encryption Type" is data representing the type of the encryption performed on the data transmitted and received in the network constituted by the broadcast data receiving apparatus 100 that is a registrar. "Network Key" is an encryption key for use in the encryption. "MAC Address" is a physical address that identifies an apparatus provided in the network.

"Vendor Extension" is an area in which extension data can be added. In this embodiment, the broadcast data receiving apparatus 100 adds, to "Vendor Extension," WOL-setting data for setting WOL.

Figure 6:
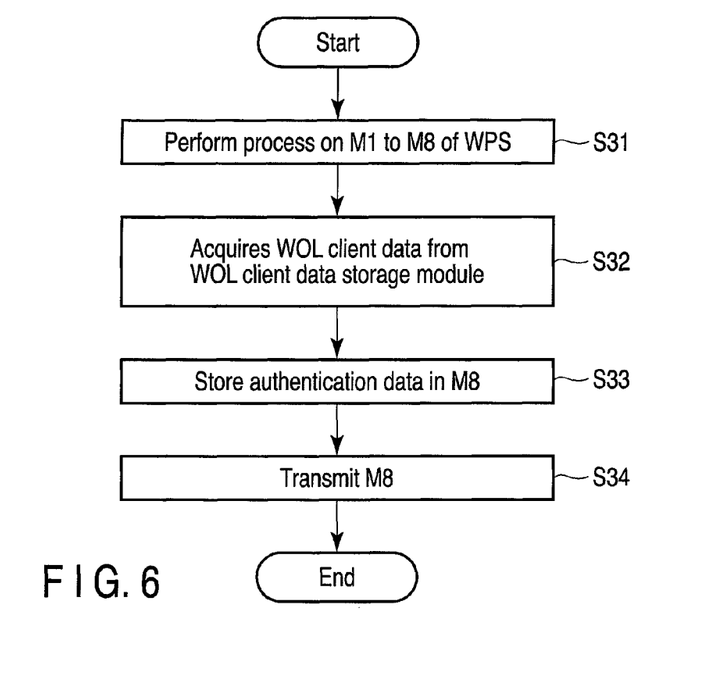
FIG. 6 is an exemplary view for explaining a process performed in the broadcast data receiving apparatus according to an embodiment.

FIG. 6 is a flowchart for explaining the WPS process performed in the broadcast data receiving apparatus 100 shown in FIG. 1.

The WPS registrar processing module 171 of the broadcast data receiving apparatus 100 exchanges the messages Ml to M8 with the data record/playback apparatus 200 on the basis of the data stored in the WLAN-setting data storage module 172. Various setting processes are thereby performed (Step S31).

In generating the message M8, the WPS registrar processing module 171 adds data items, such as "Network Index," "SSID," "Authentication Type," "Encryption Type," "Network Key," "MAC Address" and "Vendor Extension," to the message M8, on the basis of the data stored in the WLAN-setting data storage module 172.

The WPS registrar processing module 171 adds "Extension Type" in accordance with the specification of the WOL process module 180.

Further, the WPS registrar processing module 171 acquires the authentication data stored in the WOL client data storage module 182 and adds "Extension Value" (Step S32).

The WPS registrar processing module 171 adds "Extension Length" on the basis of the data length of "Extension Value."

Having performed the process, the WPS registrar processing module 171 generates WOL-setting data of TLV type. The WPS registrar processing module 171 then adds the WOL-setting data, thus generated, to "Vendor Extension" of the message M8 (Step S33). That is, the WPS registrar processing module 171 function as WOL-setting data addition module configured to add the WOL-setting data to messages.

The broadcast data receiving apparatus 100 transmits the message M8, thus generated, to the data record/playback apparatus 200 (Step S34).

As described above, the broadcast data receiving apparatus 100 according to this embodiment adds the authentication data about the WOL client, which the use should input, in the extension area of the message transmitted in the WPS process. The WOL setting can therefore be accomplished even if the user does not input the authentication data about the client to the server.

Figure 7:
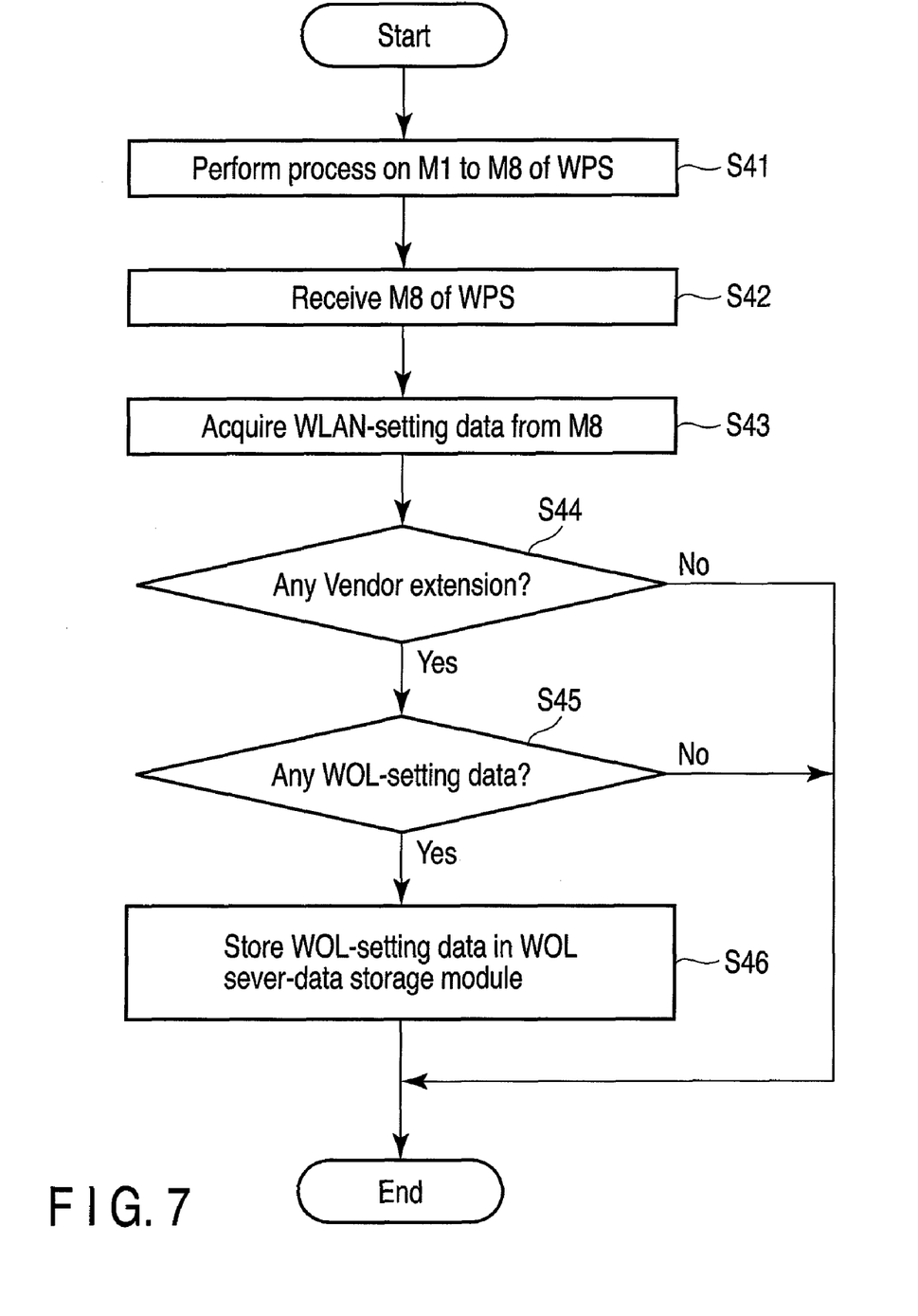
FIG. 7 is an exemplary view for explaining a different process performed in the broadcast data receiving apparatus according to an embodiment.

FIG. 7 is a flowchart for explaining a process performed in the broadcast data receiving apparatus 100 shown in FIG. 1.

In the data record/playback apparatus 200, the WPS enrollee processing module 273 exchange the messages Ml to M8 with the broadcast data receiving apparatus 100, on the basis of the data stored in the WLAN-setting data storage module 272, thereby performing various setting processes (Step S41).

The WPS enrollee processing module 273 receives the message M8 from the broadcast data receiving apparatus 100 (Step S42).

If the WPS enrollee processing module 273 receives the message M8, it will acquire, from the message M8, WLAN-setting data items such as "data items such as "Network Index," "SSID," "Authentication Type," "Encryption Type," "Network Key" and "MAC Address" (Step S43). The WPS enrollee processing module 273 stores the WLAN-setting data items in the WLAN-setting data storage module 272. The WLAN setting process is thereby completed between the data record/playback apparatus 200 and the broadcast data receiving apparatus 100.

Further, the WPS enrollee processing module 273 determines whether "Vendor Extension" has been added to the message M8 (Step S44).

If "Vendor Extension" has been added to the message M8 (YES in Step S44), the WPS enrollee processing module 273 determines whether the WOL-setting data is contained in "Vendor Extension" (Step S45).

If the WOL-setting data is contained in "Vendor Extension" (YES in Step S45), the WPS enrollee processing module 273 acquires the WOL-setting data from the message M8 and stores the same in the WOL sever-data storage module 284 (Step S46). That is, the WPS enrollee processing module 273 functions as WOL-setting data acquisition module that acquires the WOL-setting data from messages.

As described above, the data record/playback apparatus 200 according to this embodiment acquires, in the WPS process, the WOL-setting data contained in a message transmitted from the broadcast data receiving apparatus 100. The WOL setting can therefore be accomplished even if the user does not input the authentication data about the client to the server.

As indicated above, the user can turn on the power supply of the data record/playback apparatus 200 by setting WOL at the broadcast data receiving apparatus 100. Hence, even if the broadcast data receiving apparatus 100 and the data record/playback apparatus 200 are installed in different rooms, the power supply of the data record/playback apparatus 200 can be easily turned on. This makes it easy for the broadcast data receiving apparatus 100 to play back any content recorded in the data record/playback apparatus 200, by utilizing, for example, DLNA. Thus, the present embodiment can provide a communication apparatus and a communication method, which are very user-friendly.

The contents mentioned above include moving pictures, still pictures, and broadcast character data composed mainly of text data. Moreover, any apparatus that has WLAN function and WOL function and can record or play back contents can implement the present embodiment.

In the embodiment described above, two apparatuses, i.e., broadcast data receiving apparatus 100 and data record/playback apparatus 200, exist in the communication system 1. However, the embodiment is not limited to this configuration. For example, a WOL server may be added to the system 1. Further, a plurality of registrars may exist to register WLAN enrollees.

In the embodiment described above, the broadcast data receiving apparatus 100 and data record/playback apparatus 200 have a wireless communication module 167 and a wireless communication module 267, respectively. The embodiment is not limited to this configuration. For example, a WLAN slave apparatus having an antenna and a data processing module may be used to perform wireless communication with either apparatus. In this case, the WLAN slave apparatus is connected to, for example, a USB terminal.

In the embodiment described above, "Vendor Extension" of the message M8 transmitted by the broadcast data receiving apparatus 100 may contain other data. If "Vendor Extension" contains data representing an encryption key or encryption type, the broadcast data receiving apparatus 100 and data record/playback apparatus 200 can communicate with each other, exchanging encrypted data about WOL.

The various modules of the broadcast data receiving apparatus 100 and data record/playback apparatus 200 can be implemented as hardware modules, or software modules of a microcomputer a representative example of which is a CPU (or MPU).

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
   a transmission and reception module configured to transmit data to, and receive data from, an external apparatus through wireless communication;
   a wireless LAN (WLAN)-setting data storage module configured to store data for setting a WLAN function;
   a registration process module configured to transmit the data to, and receive the data from, the external apparatus via the transmission and reception module on the basis of the data stored in the WLAN-setting data storage module, and to register the external apparatus as an enrollee;
   a wake-on-LAN (WOL)-setting data storage module configured to store WOL-setting data for setting a WOL function with respect to the external apparatus; and
   a WOL-setting data addition module configured to add the WOL-setting data stored in the WOL-setting data storage module to the data before transmission by the registration process module to the external apparatus.

2. The communication apparatus of claim 1, wherein the WOL-setting data storage module is configured to store a Media Access Control (MAC) address of the communication apparatus as WOL-setting data.

3. The communication apparatus of claim 1, wherein the WOL-setting data storage module is further configured to store an encryption key that is used to perform the WOL function, and the WOL-setting data addition module is further configured to add the encryption key stored in the WOL-setting data storage module to the data before transmission by the registrar process module to the external apparatus.

4. A communication apparatus comprising:
   a transmission and reception module configured to transmit data to, and receive data from, an external apparatus through wireless communication;
   a WLAN-setting data storage module configured to store data for setting a WLAN function;
   an enrollee process module configured to transmit the data to, and receive the data from, the external apparatus via the transmission and reception module on the basis of the data stored in the WLAN-setting data storage module, and to register the communication apparatus as an enrollee of the external apparatus;
   a WOL-setting data acquisition module configured to acquire WOL-setting data from the data the enrollee process module has received from the external apparatus; and
   a WOL-setting data storage module configured to store the WOL-setting data acquired by the WOL-setting data acquisition module.

5. A communication method of achieving wireless communication between a first communication apparatus and a second communication apparatus, the method comprising:

exchanging data between the first and second communication apparatuses on the basis of data for setting a WLAN stored in the first and second communication apparatuses, and registering the second communication apparatus as an enrollee of the first communication apparatus;

adding WOL-setting data stored in the first communication apparatus for setting a WOL function between the first and second communication apparatuses to data to be transmitted from the first communication apparatus to the second communication apparatus; and acquiring the WOL-setting data added to the data; and recording the acquired WOL-setting data in the second communication apparatus.

* * * * *